US012803038B2

(12) United States Patent
Yang et al.

(10) Patent No.: US 12,803,038 B2
(45) Date of Patent: Nov. 17, 2026

(54) SEPARATOR SUPPLYING DEVICE AND SEPARATOR SUPPLYING METHOD USING THE SAME

(71) Applicant: SK On Co., Ltd., Seoul (KR)

(72) Inventors: Ji Won Yang, Daejeon (KR); Jeong Seob Lee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 95 days.

(21) Appl. No.: 18/914,263

(22) Filed: Oct. 14, 2024

(65) Prior Publication Data

US 2025/0125399 A1 Apr. 17, 2025

(30) Foreign Application Priority Data

Oct. 13, 2023 (KR) ........................ 10-2023-0136415

(51) Int. Cl.
*H01M 10/04* (2006.01)

(52) U.S. Cl.
CPC ... *H01M 10/0409* (2013.01); *H01M 10/0431* (2013.01)

(58) Field of Classification Search
CPC ............. H01M 10/04; H01M 10/0409; H01M 10/0431; B65H 21/00; B65H 2301/46; B65H 2301/463
See application file for complete search history.

(56) References Cited

U.S. PATENT DOCUMENTS

| | | | | |
|---|---|---|---|---|
| 3,939,032 | A * | 2/1976 | Taitel | B65H 21/00 156/518 |
| 4,190,483 | A * | 2/1980 | Ryan | B65H 19/20 242/552 |
| 10,287,123 | B2 * | 5/2019 | Pedercini | B65H 21/00 |
| 10,766,728 | B2 * | 9/2020 | Kummel | B65H 19/1852 |
| 2024/0002184 | A1 * | 1/2024 | Yang | B65H 19/12 |

FOREIGN PATENT DOCUMENTS

| | | |
|---|---|---|
| KR | 10-0819183 B1 | 4/2008 |
| KR | 10-1695650 B1 | 1/2017 |

* cited by examiner

*Primary Examiner* — Sang K Kim
(74) *Attorney, Agent, or Firm* — IP & T GROUP LLP

(57) ABSTRACT

The present disclosure relates to a separator supplying device capable of continuously supplying a separator and a separator supplying method using the same, which can minimize the space for replacing a separator and prevents separator cutting defects that occur when cutting the separator, thereby supplying a separator with a low defect rate.

20 Claims, 18 Drawing Sheets

SEPARATOR SUPPLYING DEVICE AND SEPARATOR SUPPLYING METHOD USING THE SAME

CROSS-REFERENCE TO RELATED PATENT APPLICATION

The present application claims priority under 35 U.S.C. § 119(a) to Korean patent application number 10-2023-0136415 filed on Oct. 13, 2023, in the Korean Intellectual Property Office, the entire disclosure of which is incorporated by reference herein.

BACKGROUND OF THE INVENTION

1. Field

The present disclosure relates to a separator supplying device. More specifically, it relates to a separator supplying device capable of continuously supplying a separator and a separator supplying method using the same.

2. Description of the Related Art

A secondary battery is a battery that is made to convert electrical energy into chemical energy and store it so that it may be reused multiple times through charging and discharging. Secondary batteries are widely used across industries due to their economical and eco-friendly characteristics. In particular, among secondary batteries, lithium secondary batteries are widely used throughout industries, including portable devices that require high-density energy.

The operating principle of lithium secondary batteries is an electrochemical oxidation-reduction reaction. In other words, the principle is that electricity is generated through the movement of lithium ions and charged in the reverse process. In the case of a lithium secondary battery, a phenomenon in which lithium ions in an anode escape therefrom and move to a cathode through an electrolyte and a separator is referred to as discharging. In addition, the opposite process of this phenomenon is referred to as charging.

A separator is disposed between a cathode and an anode to prevent short circuits between the cathode and the anode. When a separator is exhausted, an operator must manually cut the separator and connect the cut part to a new separator to replace the separator. The time and manpower required for this process may reduce production efficiency.

In addition, when the devices for fixing a separator, cutting the separator, and connecting the separator are provided separately, space efficiency may be reduced due to the volume occupied by each device, and difficulties may arise in designing a separator supplying device.

SUMMARY OF THE INVENTION

A problem that the present disclosure aims to solve is to provide a separator supplying device capable of continuously supplying a separator.

In addition, the present disclosure seeks to minimize the space for replacing a separator and prevents separator cutting defects that occur when cutting the separator, thereby supplying a separator with a low defect rate.

In addition, the present disclosure seeks to reduce the manpower and working time put into a separator replacement operation, thereby improving the efficiency of the manufacturing process.

In addition, the present disclosure can be widely applied in the field of electric vehicles, battery charging stations, and green technology, such solar power generation, and wind power generation using batteries.

In addition, the present disclosure can be used in eco-friendly electric vehicles, hybrid vehicles, and others to prevent air pollution and climate change by suppressing greenhouse gas emissions.

A separator supplying device of the present disclosure includes: a first supplying portion and a second supplying portion in which roll-shaped separators are each wound; a guide portion guiding one separator of the separator wound in the first supplying portion and the separator wound in the second supplying portion to be unwound and move toward a stacking area in which the one separator is stacked; a fixing portion in which another separator connectable to the one separator is unwound and fixed; and a first holding portion and a second holding portion, which are disposed with the one separator and the other separator interposed therebetween and are capable of moving toward each other so as to be connectable and separable from the one separator and the other separator, in order to cut and connect the one separator and the other separator; wherein a separator of the first supplying portion and a separator of the second portion each include a preset first cutting area positioned on each of the separators and a preset second cutting area positioned farther from the stacking area than the first cutting area, and the second holding portion includes: a holding body forming an outer shape of the second holding portion; a cutting portion provided at a first mounting position preset in the holding body and cutting a second cutting area positioned on the one separator and a first cutting area positioned on the other separator; and a connecting portion provided at a second mounting position preset in the holding body and connecting the one separator and the other separator to each other after the cutting portion cuts the separators.

The second holding portion may be deformable into a first arrangement in which the cutting portion is positioned toward the first holding portion, and a second arrangement in which the connecting portion is positioned toward the first holding portion.

The second holding portion may further include a body rotation axis provided in parallel with the width direction of the separator through the holding body and rotatably supporting the holding body, and may be deformable into any one arrangement of the first arrangement and the second arrangement through the rotation of the holding body based on the body rotation axis.

The second holding portion may further include a connecting rotation axis provided perpendicular to the width direction of the separator and the length direction of the separator, and the connecting portion may be rotatable through the rotation of the second mounting position based on the connecting rotation axis.

When the length from the second cutting area of the one separator to one end wound in the supplying portion becomes less than or equal to a preset residual length, the cutting portion may cut the second cutting area of the one separator and the first cutting area of the other separator.

The first supplying portion and the second supplying portion may each include a roller on which the two separators are wound, and when the length of the one separator becomes less than or equal to a preset residual length, the rotation of the roller on which the one separator is wound may be stopped, and when the one separator and the other separator are connected by the connecting portion, the rotation of the roller on which the other separator is wound may be initiated.

The separator supplying device may further include a sensing portion for sensing the thickness of the separator wound on the roller.

The separator supplying device may further include a control portion controlling the sensing portion, the roller, the first holding portion, and the second holding portion.

The stacking area may be provided at a position opposite to the second holding portion based on the path along which the two separators are unwound.

The first holding portion may include a first contacting portion and a first retaining portion contactable with and separable from the one separator and the other separator, the second holding portion may include a second contacting portion and a second retaining portion contactable with and separable from a separator with which the first holding portion is uncontacted, and the two separators may each be fixable by the first contacting portion, the first retaining portion, the second contacting portion, and the second retaining portion.

The separator supplying device may include: a connecting portion supplying portion on which the connecting portion is wound; a connecting portion fixing portion fixing one end of the connecting portion and moving in a direction away from the connecting portion supplying portion to unwind the connecting portion; and a connecting portion cutting portion capable of cutting an area of the connecting portion.

When the connecting portion comes into contact with the second mounting position of the second holding portion, the connecting portion cutting portion may cut an area of the connecting portion, and the fixing of the connecting portion fixing portion and the connecting portion may be released.

The separator supplying device may further include: a guide block provided between the area of the connecting portion cut by the connecting portion cutting portion and the connecting portion supplying portion to fix the connecting portion; and an unwinding guide portion capable of unwinding the connecting portion by a preset length by moving in a direction opposite to the direction in which the connecting portion fixing portion moves.

A separator supplying method according to the present disclosure, which is a method of supplying a separator including: a first supplying portion and a second supplying portion in which roll-shaped separators are each wound; a guide portion guiding one separator of the separator wound in the first supplying portion and the separator wound in the second supplying portion to be unwound and move toward a stacking area in which the one separator is stacked; and a fixing portion in which another separator connectable to the one separator is unwound and fixed, wherein a separator wound in the first supplying portion and a separator wound in the second portion include a preset first cutting area positioned on each of the separators and a preset second cutting area positioned farther from the stacking area than the first cutting area, the method including: a contacting step in which a first holding portion and a second holding portion come into contact with the two separators; a cutting step in which a cutting portion provided at a first mounting position of the second holding portion cuts each of the one separator and the other separator; and a connecting step in which a connecting portion provided at a second mounting position of the second holding portion connects one of the one separator and the other separator.

In the cutting step, the cutting portion provided at the second holding portion may form a first arrangement positioned toward the first holding portion, and in the connecting step, the connecting portion may form a second arrangement positioned toward the first holding portion.

The separator supplying method may further include: a determining step in which a control portion controlling the first supplying portion, the second supplying portion, the first holding portion, and the second holding portion compares the length from the second cutting area of the one separator to one end wound in the supplying portion with the preset residual length to determine rotation of the supplying portion.

In the contacting step, a first contacting portion and a first retaining portion of the first holding portion may be in contact with the one separator, and a second contacting portion and a second retaining portion of the second holding portion may be in contact with the other separator.

The cutting step may include: a cutting portion moving step in which the cutting portion moves toward the separators to cut the separators; a separator separating step in which, after the separator is cut, the first contacting portion and the one separator are separated, and the second contacting portion and the other separator are separated; and a separator moving step in which the other separator in contact with the second retaining portion is separated from the second retaining portion and moves toward the first contacting portion to contact with the first contacting portion.

The connecting step may include: a connecting portion unwinding step in which a connecting portion fixing portion fixing one end of a connecting portion unwound from a connecting portion supplying portion in which the connecting portion is wound moves in a direction away from the connecting portion supplying portion and unwinds the connecting portion; a connecting portion contacting step in which the second holding portion moves in a direction away from the two separators and come into contact with the unwound connecting portion; a connecting portion cutting step in which a connecting portion cutting portion cutting an area of the connecting portion cuts an area of the unwound connecting portion; and a connecting portion attaching step in which the second holding portion moves toward the separators and attaches the connecting portion to connect the one separator and the other separator.

The connecting portion unwinding step may include: a connecting portion fixing step in which a guide block provided between one area of the connecting portion cut by the connecting portion cutting portion and the connecting portion supplying portion comes into contact with the connecting portion; a preliminary unwinding step in which an unwinding guide portion unwinding the connecting portion by a preset length moves in a direction opposite to the direction in which the connecting portion fixing portion moves; and a main unwinding step in which, when the connecting portion is unwound by a preset length, the guide block and the connecting portion are separated, and the connecting portion fixing portion moves.

The present disclosure can provide a separator supplying device capable of continuously supplying a separator.

In addition, the present disclosure can minimize the space for replacing a separator and prevents separator cutting defects that occur when cutting the separator, thereby supplying a separator with a low defect rate.

In addition, the present disclosure can reduce the manpower and working time put into a separator replacement operation, thereby improving the efficiency of the manufacturing process.

DETAILED DESCRIPTION

Figure 1A:
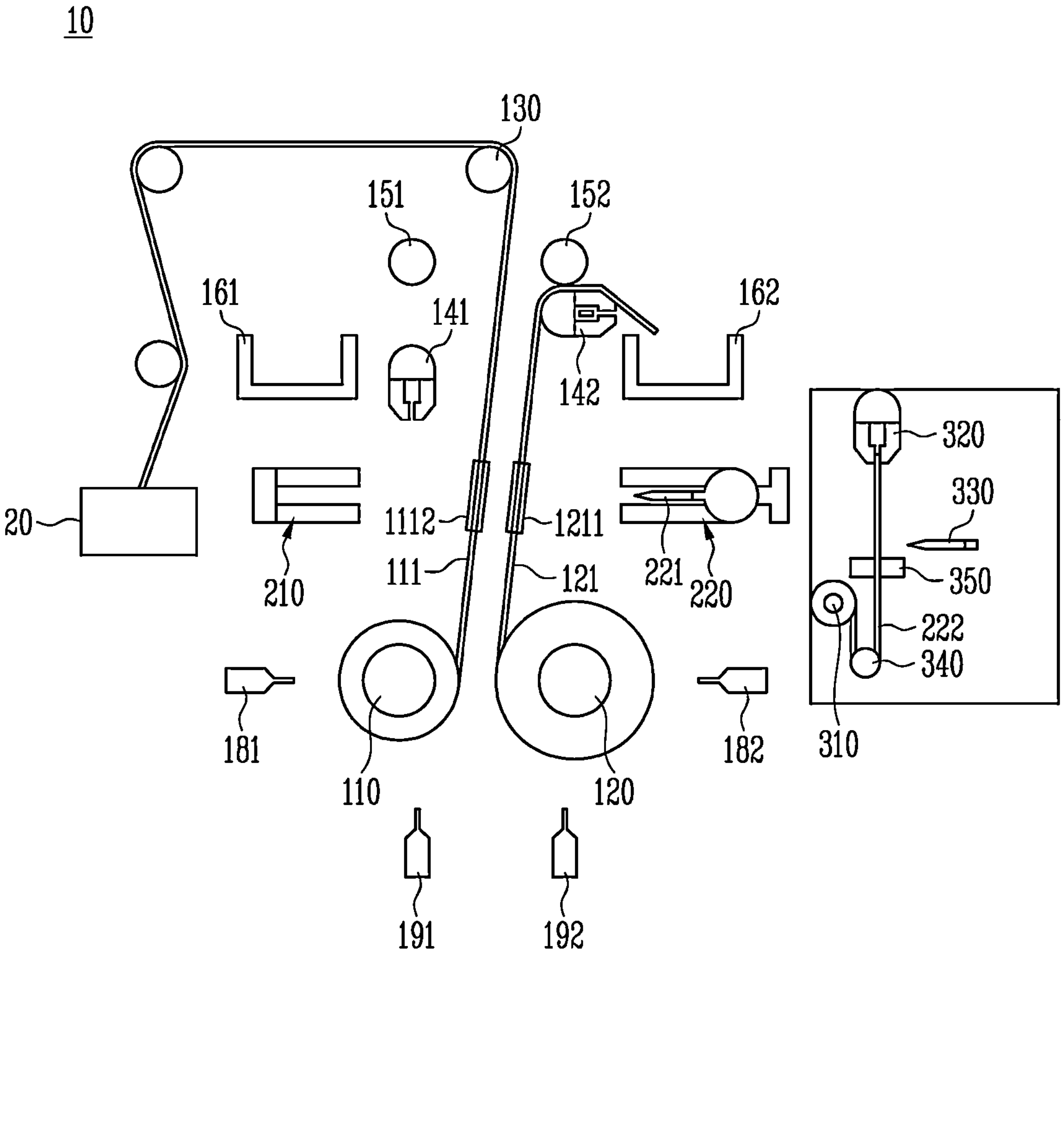
FIGS. 1A to 1F illustrate a separator supplying device according to the present disclosure.

Hereinafter, preferred embodiments of the present disclosure will be described in detail with reference to the attached drawings. The configuration or control method of the apparatus described below is only for explaining the embodiments of the present disclosure and is not intended to limit the scope of the present disclosure, and the same reference numerals used throughout the specification indicate the same components.

Specific terms used in the present specification are merely for convenience of explanation and are not used to limit the illustrated embodiments.

For example, expressions such as “same” and “is the same” not only indicate a strictly identical state, but also indicate a state in which there is a difference in tolerance or the degree to which the same function is obtained.

For example, expressions representing relative or absolute arrangement such as “in a certain direction,” “along a certain direction,” “side by side,” “perpendicularly,” “at the center,” “concentric,” or “coaxial,” not only strictly represent the arrangement, but also represent the state of relative displacement with a tolerance, or an angle or distance at which the same function is obtained.

To explain the present disclosure, it will be described below based on a spatial orthogonal coordinate system with X, Y, and Z axes orthogonal to each other. Each axis direction (X-axis direction, Y-axis direction, Z-axis direction) refers to both directions in which each axis extends.

The X-direction, Y-direction, and Z-direction mentioned below are for explanation so that the present disclosure may be clearly understood, and of course, the directions may be defined differently depending on where the reference is placed.

The use of terms such as ‘first, second, and third’ in front of the components mentioned below is only to avoid confusion about the components to which they are referred and is irrelevant to the order, importance, or master-slave relationship between the components, etc. For example, an invention that includes only a second component without a first component may also be implemented.

As used in this specification, singular expressions include plural expressions unless the context clearly dictates otherwise.

FIGS. 1A to 1F illustrate a separator supplying device 10 according to the present disclosure.

Referring to FIG. 1A, a separator supplying device 10 according to the present disclosure includes: a first supplying portion 110 and a second supplying portion 120 in which roll-shaped separators are each wound; a guide portion 130 guiding one separator 111 of the separator 111 wound in the first supplying portion 110 and the separator 121 wound in the second supplying portion 120 to be unwound and move toward a stacking area 20 in which the one separator is stacked; a fixing portion 141 and 142 in which another separator 121 connectable to the one separator 111 is unwound and fixed; and a first holding portion 210 and a second holding portion 220, which are disposed with the one separator 111 and the other separator 121 interposed therebetween and are capable of moving toward each other so as to be connectable and separable from the one separator 111 and the other separator 121, in order to cut and connect the one separator 111 and the other separator 121.

In addition, a separator of the first supplying portion 110 and a separator of the second portion 120 each include a preset first cutting area 1112 positioned on each of the separators and a preset second cutting area 1211 positioned farther from the stacking area than the first cutting area 1112

In addition, the second holding portion 220 includes: a holding body 223 forming an outer shape of the second holding portion 220; a cutting portion 221 provided at a first mounting position 2231 (FIG. 2A) preset in the holding body 223 and cutting a second cutting area 1211 positioned on the one separator 111 and a first cutting area 1112 positioned on the other separator 121; and a connecting portion 222 provided at a second mounting position 2232 (FIG. 2A) preset in the holding body 223 and connecting the one separator 221 and the other separator 111 to each other after the cutting portion 221 cuts the separators.

A separator may be configured to prevent electrical short circuits between a cathode and an anode of a battery and to generate a flow of ions. A cathode, an anode, and a separator may be assembled to form an electrode assembly. Electrode assemblies may be classified into a jelly roll type, a stack type, and a stack and folding type structure depending on the shape in which a cathode, an anode, and a separator are stacked.

The type of separator is not particularly limited, but may include a porous polymer film or a porous non-woven fabric.

A separator 111 and 121 may be moved toward a stacking area 20. A stacking area 20 may refer to an area where a separator is stacked together with a cathode and an anode. In other words, in a stacking area 20, a separator may be stacked together with a cathode and an anode.

Moving toward a stacking area 20 means that the separator is supplied prior to stacking. Ultimately, since the separator 111 and 121 supplied by a separator supplying device 10 according to the present disclosure moves toward a stacking area 20, it does not necessarily mean that the separator 111 and 121 must be stacked immediately after supply, and a separate process may be included.

A separator 111 and 121 includes a cutting area 1112 and 1211. A cutting area 1112 and 1211 may be provided on a separator 111 and 121. A cutting area 1112 and 1211 may mean an area where a separator 111 and 121 is cut. In addition, a cutting area 1112 and 1211 may mean an area where one separator 111 is cut and then connected to the other separator 121.

A cutting area 1112 and 1211 may include a first cutting area 1112 and a second cutting area 1211. A first cutting area 1112 and a second cutting area 1211 may be provided at both ends of a separator. A second cutting area 1211 may be positioned farther from a stacking area 20 than a first cutting area 1112. In other words, among the two cutting areas on the separator, the area that is supplied first to a stacking area 20 may be a first cutting area 1112. For example, referring to FIG. 1A, a first cutting area 1112 of a separator unwound from a first supplying portion 110 may be unwound prior to a second cutting area 1211.

A roll-shaped separator 111 and 121 may be wound in each of a first supplying portion 110 and a second supplying portion 120. A first supplying portion 110 and a second supplying portion 120 may unwind a separator. To this end, a first supplying portion 110 and a second supplying portion 120 may each include a roller. A separator may be wound along the outer circumference of a roller. A roller may unwind a separator through rotation. The cross-section of a roller may be circular. For example, a first supplying portion 110 and a second supplying portion 120 may be an air-chuck.

One separator 111 of a separator wound in a first supplying portion 110 and a separator wound in a second supplying portion 120 may be unwound and connected to a guide portion 130. For example, a guide portion 130 may be an idle-roller.

The separator supplying device 10 according to the present disclosure may connect one separator 111 and the other separator 121. When one separator 111 is exhausted, one separator 111 and the other separator 121 may be cut. The one separator 111 and the other separator 121 that are cut may be connected to each other.

For example, in a case where a separator unwound from a first supplying portion 110 is exhausted, after the separator is cut, the separator may be connected to a separator unwound from a second supplying portion 120. In addition, in an opposite case where a separator unwound from a second supplying portion 120 is exhausted, after the separator is cut, the separator may be connected to a separator unwound from a first supplying portion 110.

In other words, the separator supplying device 10 according to the present disclosure may continuously supply a separator toward a stacking area 20.

A cutting portion 221 may cut a second cutting area 1211 of one separator 111 and a first cutting area 1112 of the other separator 121. A connecting portion 222 may connect one end of one separator 111 and one end of the other separator 121.

Referring to FIG. 1A, a cutting portion 221 may cut a second cutting area 1211 of a separator supplied from a first supplying portion 110 and a first cutting area 1112 of a separator supplied from a second supplying portion 120. A connecting portion 222 may connect a separator supplied from a first supplying portion 110 and a separator supplied from a second supplying portion 120 to each other.

In addition, when a separator is continuously supplied from a second supplying portion 120 and exhausted, a part of the exhausted separator must be connected to a separator newly wound in a first supplying portion 110. To this end, a cutting portion 221 may cut a second cutting area 1211 of a separator supplied from a second supplying portion 120 and a first cutting area 1112 of a separator newly wound in a first supplying portion 110. A connecting portion 222 may connect the two cut separators to each other.

The other separator 121 connected to one separator 111 may be connected to a fixing portion 141 and 142. A fixing portion 141 and 142 may fix a separator unwound from another supplying portion. One separator 111 may be guided toward a stacking area 20 by a guide portion 130. A guide portion 130 may keep an unwound separator flat.

In order to replace one separator 111, the other separator 121 also needs to be unwound and fixed. A fixing portion 141 and 142 may keep the other separator 121 flat. The two separators may be provided in parallel through the fixing portion 141 and 142. Through this, the bending or folding of the separators that may occur when cutting and connecting the two separators may be prevented.

The separator supplying device 10 of the present disclosure may further include a sensing portion 181 and 182. A sensing portion 181 and 182 may determine whether a separator provided by a supplying portion is exhausted. A sensing portion 181 and 182 may sense the thickness of a separator wound in a supplying portion. For example, a sensing portion 181 and 182 may sense the thickness of a separator wound on the roller. A sensing portion 181 and 182 may be provided on the outside of each of a first supplying portion 110 and a second supplying portion 120.

The separator supplying device 10 of the present disclosure may further include a separator recognizing portion 191 and 192. A separator recognizing portion 191 and 192) may recognize information such as the length and thickness of a separator.

The separator supplying device 10 of the present disclosure may further include a control portion (not shown). A control portion may control a sensing portion 181 and 182 and a roller. In addition, a control portion may control a first holding portion 210 and a second holding portion 220.

A control portion may determine whether a separator is exhausted based on the information measured by a sensing portion 181 and 182. For example, a control portion may calculate the length of a separator wound on a roller based on the thickness of separator measured by a sensing portion 181 and 182. The length of a separator calculated by a control portion may be the length from a second cutting area 1211 to one end wound in a supplying portion.

A control portion may determine whether to replace a separator by comparing the calculated length with a preset residual length. For replacement of a separator, when the length of one separator 111 becomes shorter than or equal to a preset residual length, the rotation of a roller on which the one separator 111 is wound may be stopped. In addition, when one separator 111 and the other separator 121 are connected by a connecting portion 222, the rotation of a roller on which the other separator 121 is wound may be started.

A first holding portion 210 and a second holding portion 220 may cut and connect a separator. To this end, a first holding portion 210 and a second holding portion 220 may come into contact with a separator and be separated. A first holding portion 210 and a second holding portion 220 may come into contact with a separator and fix the separator. A first holding portion 210 and a second holding portion 220 may temporarily fix a separator. For example, a first holding portion 210 and a second holding portion 220 may fix a separator through adsorption.

A first holding portion 210 and a second holding portion 220 may each be in contact with a separator. For example, a first holding portion 210 may be in contact with a separator of a first supplying portion 110, and a second holding portion 220 may be in contact with a separator of a second supplying portion 120.

Figure 2A:
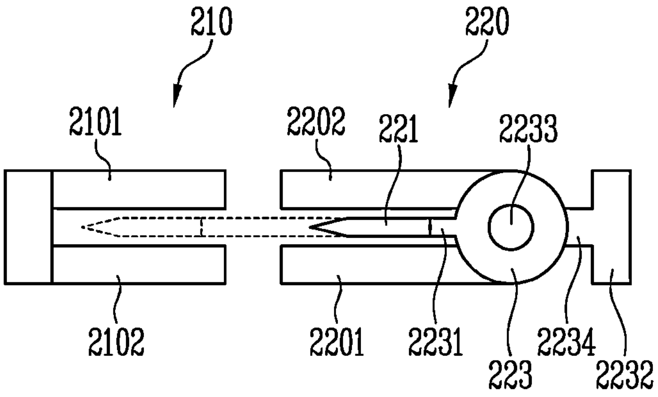
FIGS. 2A to 2C illustrate a second holding portion according to the present disclosure.

A first holding portion 210 may include a first contacting portion 2102 (FIG. 2A) and a first retaining portion 2101 (FIG. 2A), and a second holding portion 220 may include a second contacting portion 2202 (FIG. 2A) and a second retaining portion 2201 (FIG. 2A). A first contacting portion 2102, a first retaining portion 2101, a second contacting portion 2202, and a second retaining portion 2201 may each contact a separator to fix the separator.

A first contacting portion 2102 and a first retaining portion 2101 may be formed in parallel. A second contacting portion 2202 and a second retaining portion 2201 may be formed in parallel. Through this, each area in contact with a separator may be uniformly pressurized, and damage to the separator may be prevented.

A first holding portion 210 and a second holding portion 220 may be disposed with the two separators interposed therebetween. In addition, a first holding portion 210 and a second holding portion 220 may move in a direction toward or away from each other to come into contact with the two separators. To this end, a first holding portion 210 and a second holding portion 220 may further include a driving portion such as a motor or a cylinder.

A second holding portion 220 includes a holding body 223 forming an outer shape, a cutting portion 221 cutting the two separators, and a connecting portion 222 connecting the two separators. A cutting portion 221 is provided at a first mounting position 2231 of a holding body 223 and may cut a second cutting area 1211 positioned on one separator 111 and a first cutting area 1112 positioned on the other separator 121. For example, a cutting portion 221 may be a knife or a cutter.

Figure 1B:
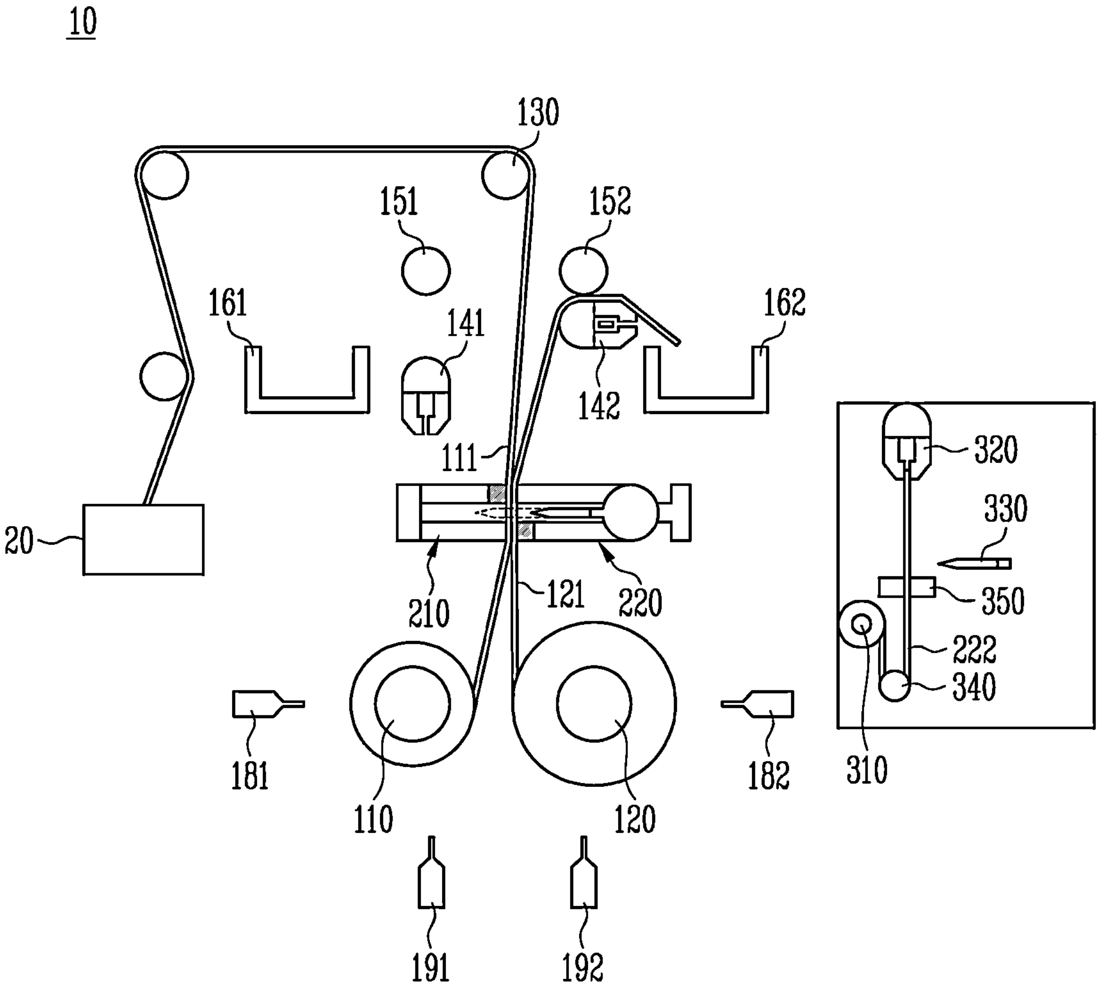

Referring to FIG. 1B, a cutting portion 221 may cut a second cutting area 1211 formed on a separator unwound from a first supplying portion 110 and a first cutting area 1112 formed on a separator unwound from a second supplying portion 120.

A cutting portion 221 may be provided between a second contacting portion 2202 and a second retaining portion 2201. In addition, a cutting portion 221 may move toward a first holding portion 210 and may move between a first contacting portion 2102 and a first retaining portion 2101. Through this, a cutting portion 221 may stably cut the two separators while the two separators are fixed.

A connecting portion 222 is provided at a preset second mounting position 2232 of a holding body 223, and a cutting portion 221 may cut one separator 111 and the other separator 121 and then connect each other. A connecting portion 222 may be separated from a second mounting position 2232 to connect the two separators. A connecting portion may include an adhesive material. For example, a connecting portion may be a tape. As a result, a second holding portion 220 needs to be supplied with a new connecting portion 222.

After the two separators are cut, one separator 111 and a first contacting portion 2102 may be separated. In addition, the other separator 121 and a second contacting portion 2202 may be separated.

Figure 1C:
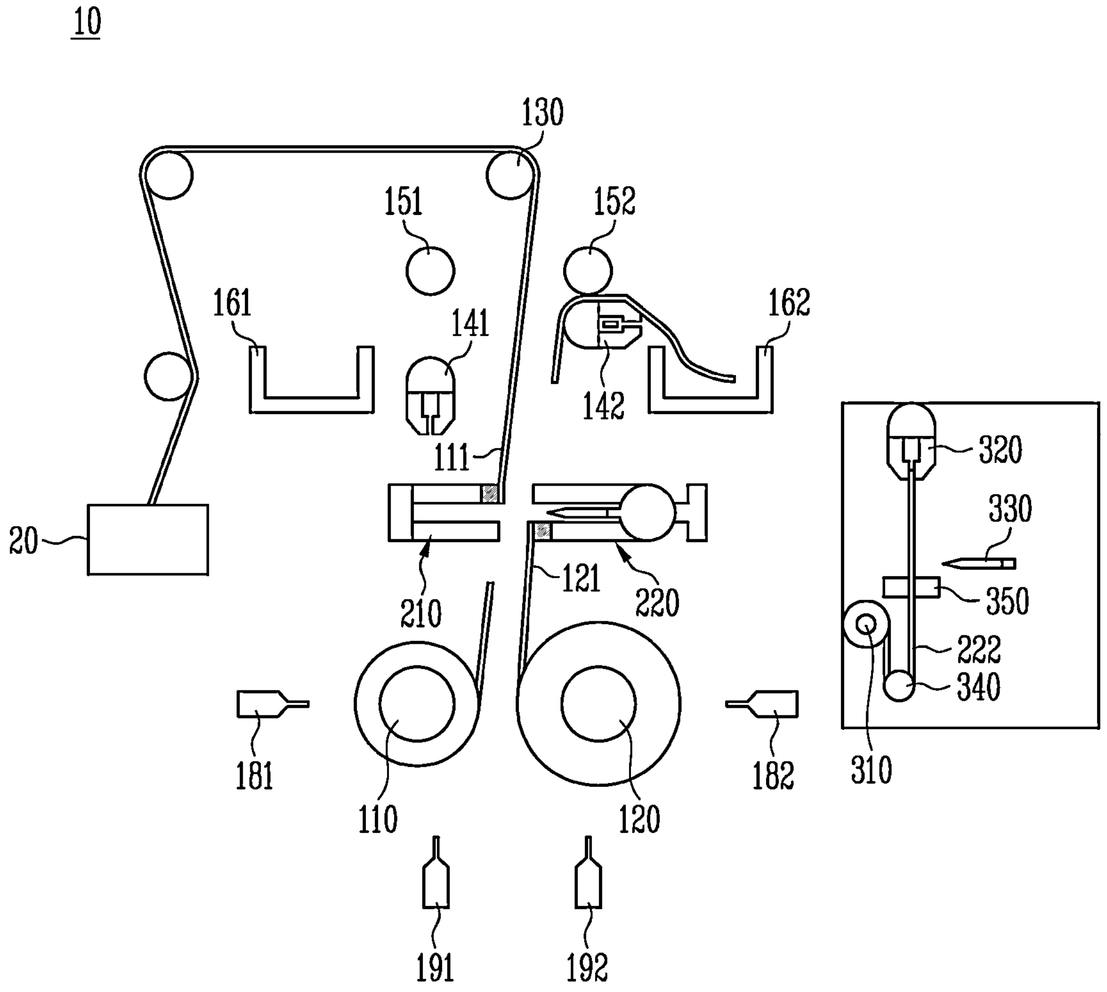

Referring to FIG. 1C, a separator unwound from a first supplying portion 110 and a first contacting portion 2102 may be separated, and a separator unwound from a second supplying portion 120 and a second contacting portion 2202 may be separated.

In order for a second holding portion 220 to move, the other separator 121 needs to be fixed to a first holding portion 210. To this end, after the contact between the other separator 121 and a second retaining portion 2201 is released, the other separator 121 may come into contact with a first contacting portion 2102. One end of one separator 111 and one end of the other separator 121 may come into contact with a first holding portion 210. Through this, a structure in which one separator 111 and the other separator 121 may be easily connected may be formed.

Figure 1D:
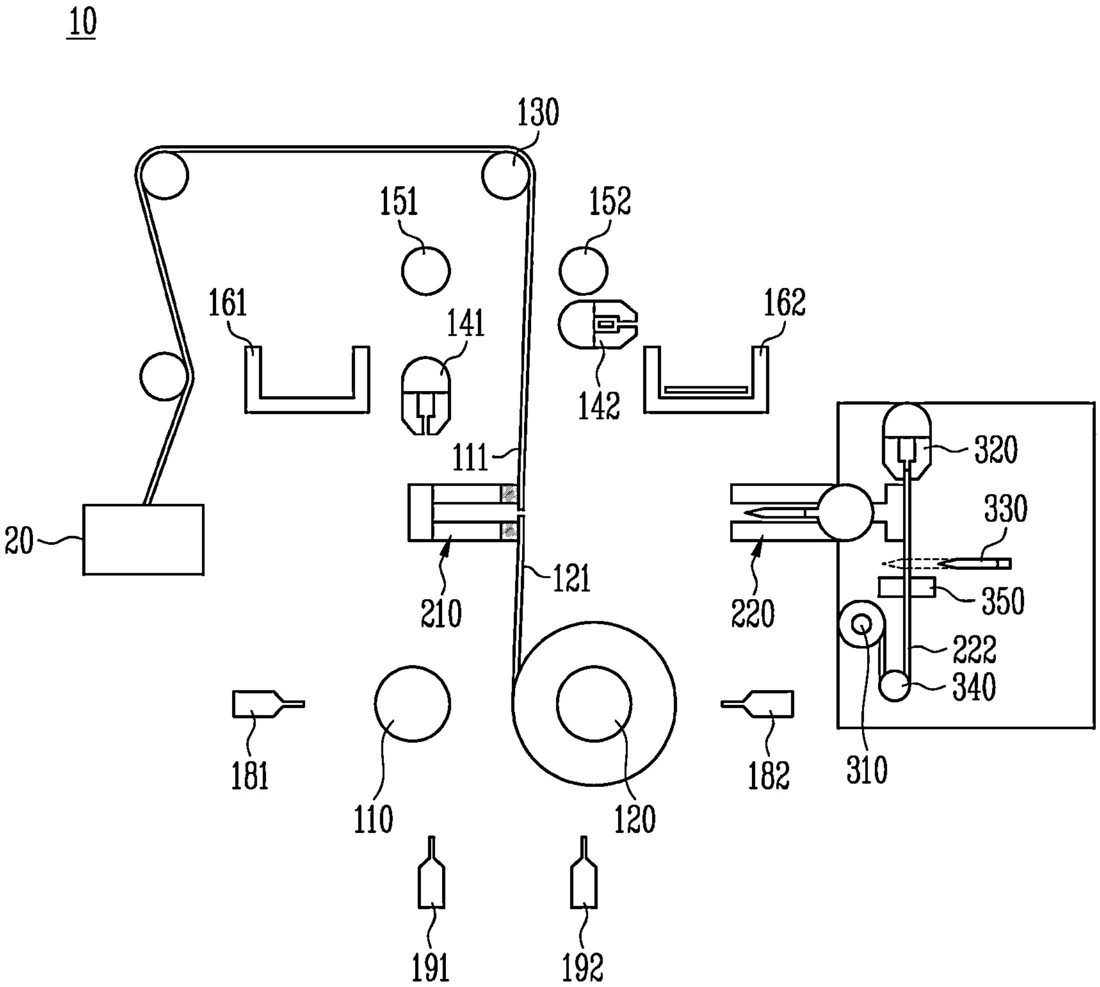

Referring to FIG. 1D, a second holding portion 220 may move freely without being in contact with a separator. For example, a second holding portion 220 may move in a direction away from a separator to be supplied with a connecting portion 222.

Figure 1E:
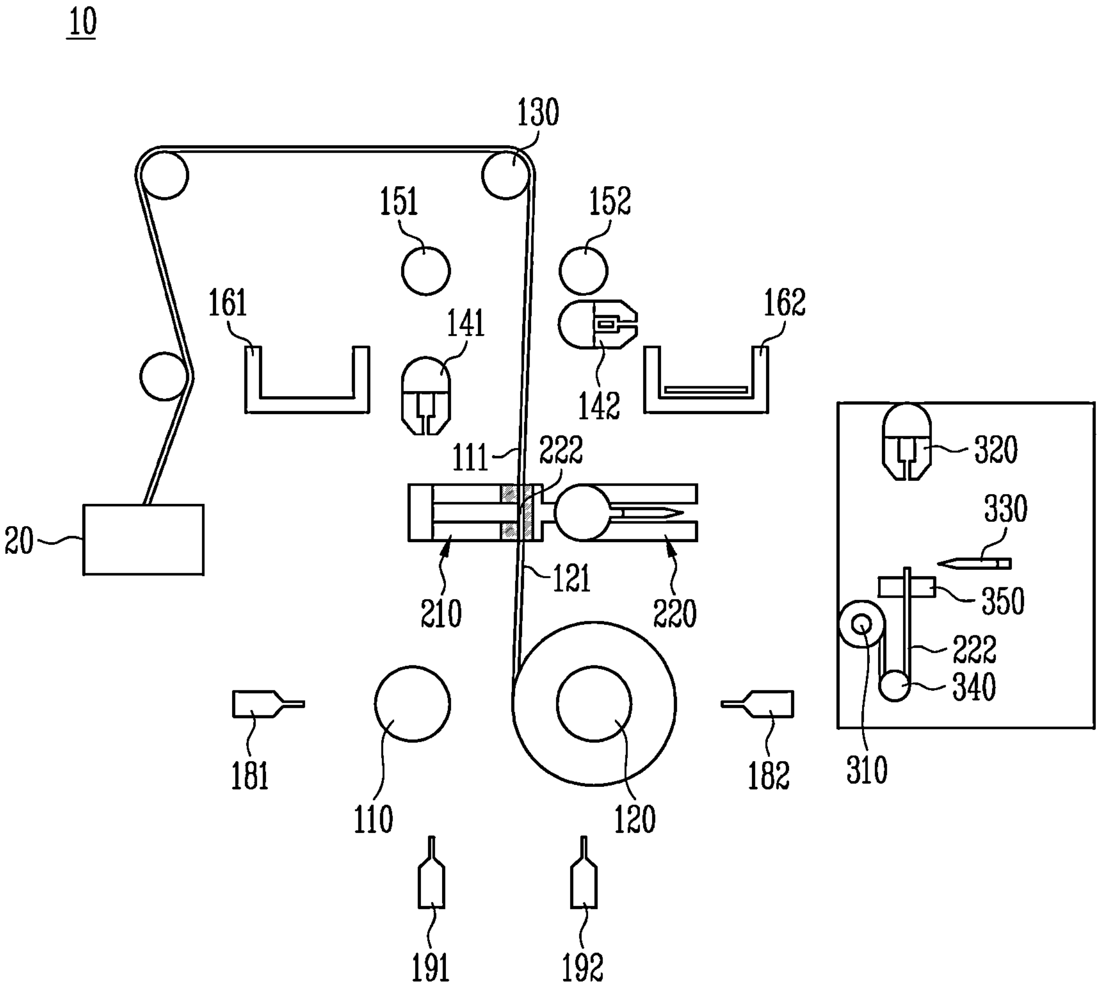
Figure 1F:
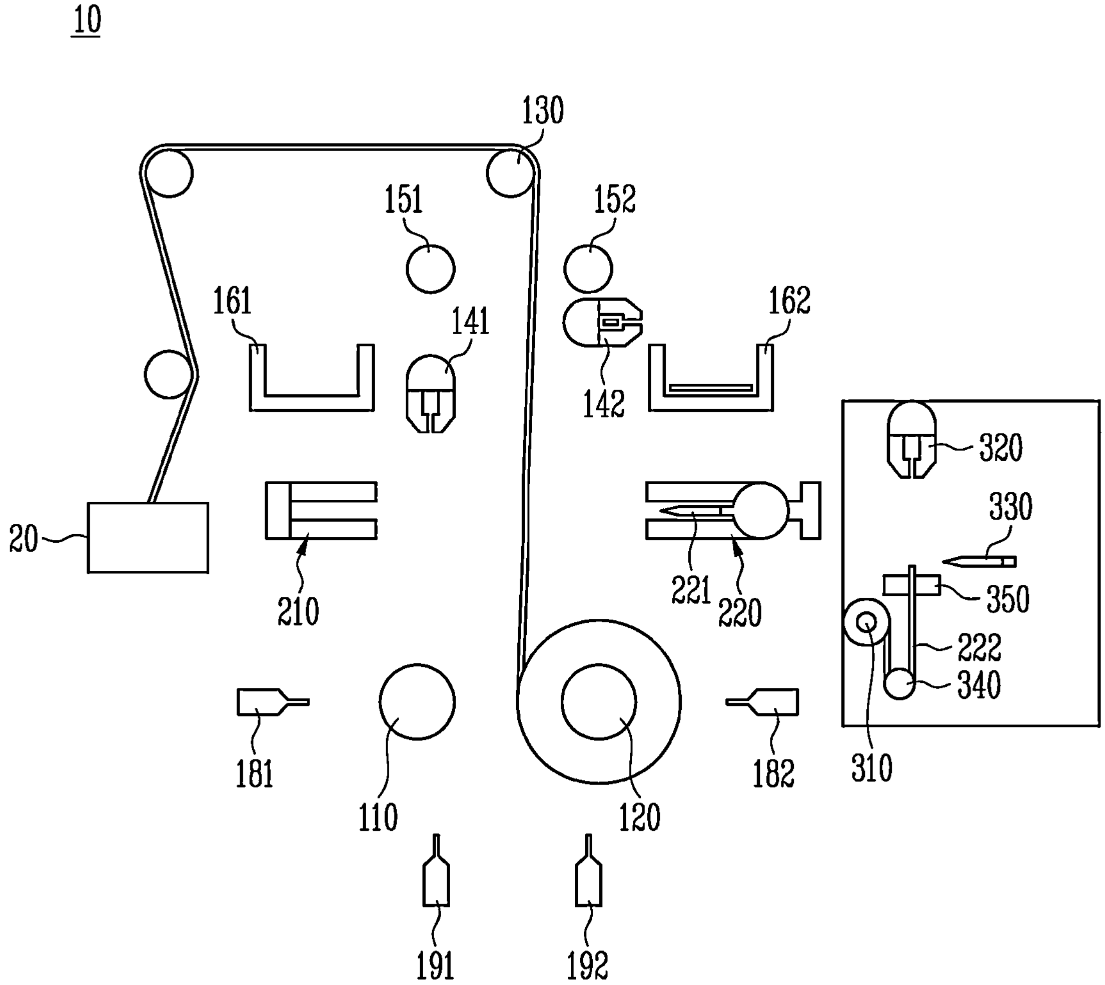

Referring to FIGS. 1E and 1F, a connecting portion 222 provided at a second mounting position 2232 of a second holding portion 220 may connect the two separators. As a result, a second holding portion 220 may provide a device that performs the functions of cutting the two separators and connecting the two separators in a single device, thereby improving space utilization and facilitating design.

A stacking area 20 may be provided at a position opposite to a second holding portion 220 based on the path along which the two separators are unwound. The two separators may be disposed between a first holding portion 210 and a second holding portion 220. A stacking area 20 may be provided in an area where a first holding portion 210 is positioned based on the two separators.

In addition, the separator supplying device of the present disclosure may further include a recovering portion 161 and 162. A recovering portion 161 and 162 may recover one separator 111 that has been cut or the other separator 121 that has been cut. After the separators are cut, a supplying portion supplying one separator 111 may move a part of one of the one separator 111 that has been cut to a recovering portion 161 and 162.

In an embodiment, the present disclosure may further include a support portion 151 and 152. A support portion 151 and 152 may each interpose a separator between fixing portions 141 and 142. A support portion 151 and 152 may be provided to be rotatable about an axis. A pair of support portions 151 and 152 may rotate in directions opposite to each other. Through this, the support portion 151 and 152 may move a separator in contact with the support portion 151 and 152.

One end of the other separator 121 connected to a supplying portion is in contact with a second retaining portion 2201, but may be separated from a second contacting portion 2202. When the other separator 121 is separated from a second contacting portion 2202, the other separator 121 may be recovered through a recovering portion.

A plurality of recovering portions may be provided to recover a separator unwound from a first supplying portion 110 and a separator unwound from a second supplying portion 120.

Figure 2B:
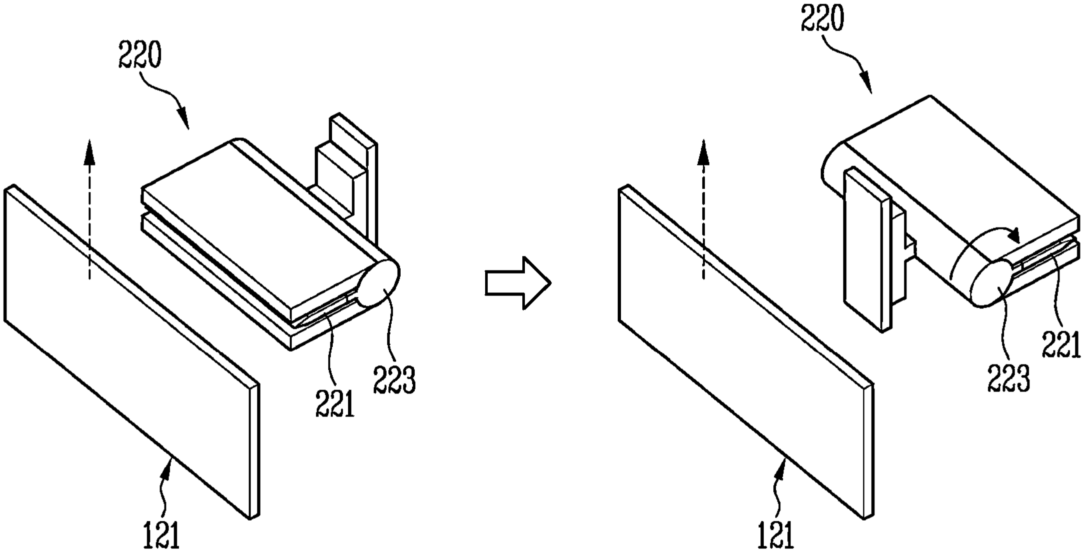
Figure 2C:
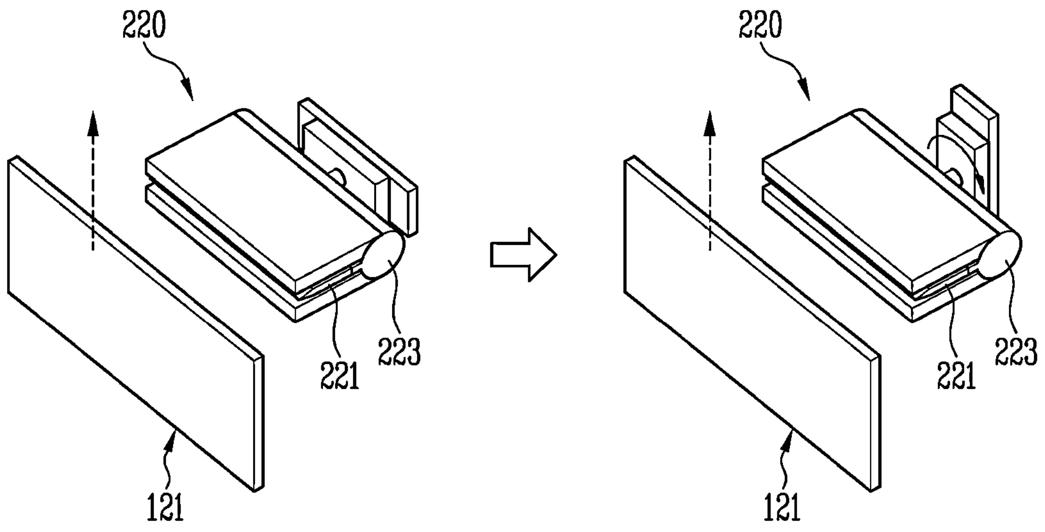
Figure 3A:
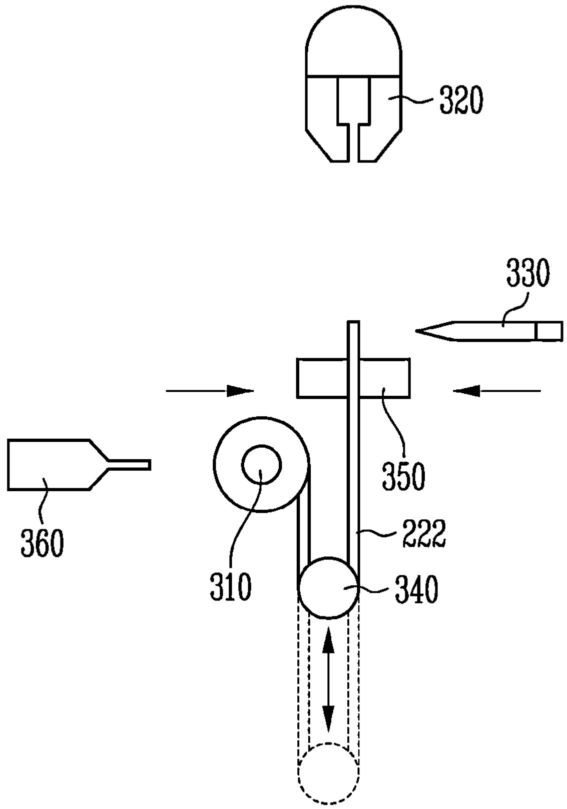
FIGS. 3A to 3E illustrate a connecting portion being supplied to the second holding portion according to the present disclosure.
Figure 3B:
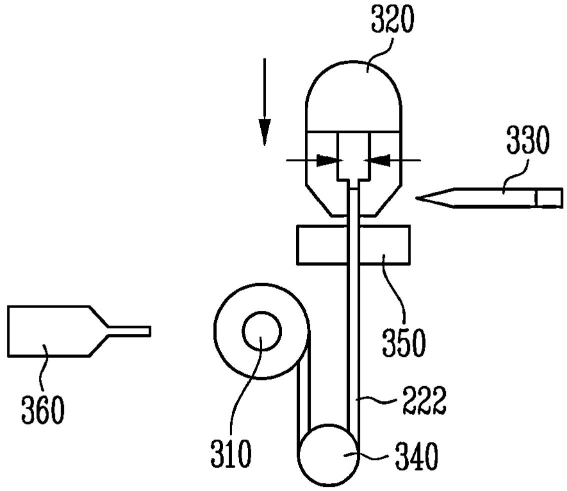
Figure 3C:
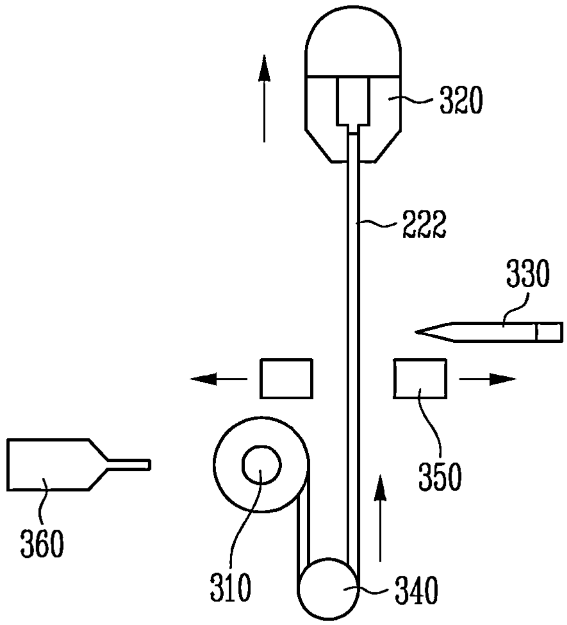
Figure 3D:
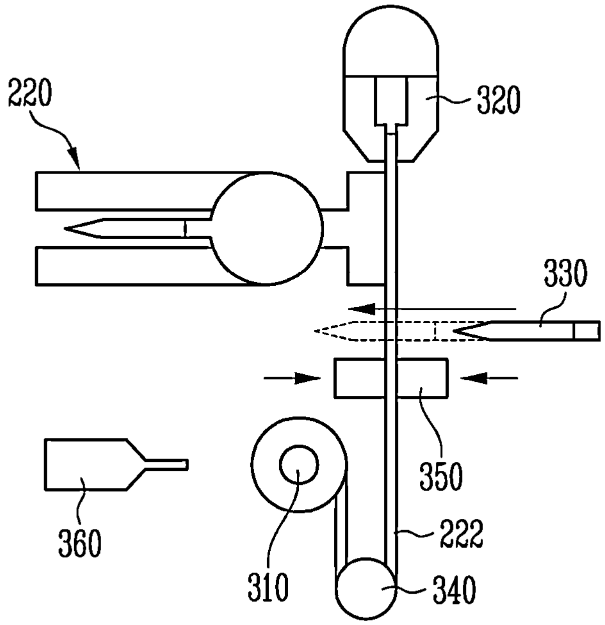
Figure 3E:
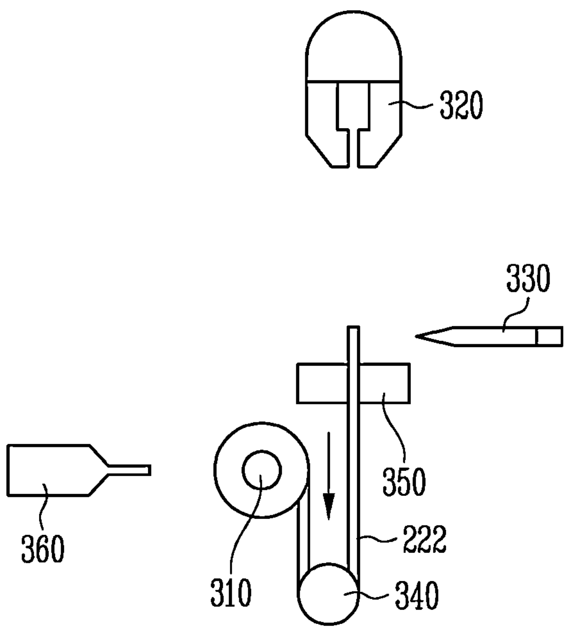

FIGS. 2A to 2C illustrate a second holding portion 220 according to the present disclosure.

As described above, a cutting portion 221 may be provided between a second contacting portion 2202 and a second retaining portion 2201 of a second holding portion 220. In addition, a cutting portion 221 may move toward a first holding portion 210 and between a first contacting portion 2102 and a first retaining portion 2101. A cutting portion 221 may be moved away from a holding body 223 by a cylinder or a motor.

A first mounting position 2231 and a second mounting position 2232 of a second holding portion 220 may each rotate to face a first holding portion 210. A cutting portion 221 may be provided at a first mounting position 2231, and a connecting portion 222 may be provided at a second mounting position 2232. As a result, a second holding portion 220 may be deformed into a first arrangement in which a cutting portion 221 is positioned toward a first holding portion 210 and a second arrangement in which a connecting portion 222 is positioned toward a first holding portion 210.

A second holding portion 220 may further include a body rotation axis provided in parallel with the width direction of a separator through a holding body 223 and rotatably supporting the holding body 223. A holding body 223 may rotate around a body rotation axis, and through this, a second holding portion 220 may be alternately deformed into a first arrangement and a second arrangement.

Referring to FIG. 2B, a holding body 223 may be provided in parallel with the width direction of a separator. In order for a cutting portion 221 to efficiently cut a separator, the cutting portion 221 needs to cut the separator in the width direction. To this end, a holding body 223 provided with a cutting portion 221 also needs to be provided in parallel with the width direction of a separator.

A body rotation axis 2233 provided in a holding body 223 may also be provided inside a holding body 223 and formed in parallel with the width direction of a separator. Through this structure, a body rotation axis may rotate so that a first arrangement and a second arrangement may be repeatedly formed.

A second holding portion 220 may further include a connecting rotation axis 2234 provided perpendicularly to the width direction of a separator and the length direction of the separator. A connecting portion 222 may be rotatable by rotation of a second mounting position 2232 based on a connecting rotation axis. A connecting rotation axis may be provided in a holding body 223.

One area of a connecting portion 222 unwound from a connecting portion supplying portion 310 may be in contact with a second mounting position 2232. A connecting portion 222 in contact with a second mounting position 2232 may connect one end of one separator 111 and one end of the other separator 121.

The width of a separator may be formed to be longer than the width of a connecting portion 222. As a result, when a connecting portion 222 unwound from a connecting portion supplying portion 310 is attached to a cutting area of a separator without rotation, the separator may not be stably connected.

Therefore, a second mounting position 2232 may come into contact with a connecting portion 222 and then rotate through a connecting rotation shaft 2234. After the rotation, the connecting portion 222 may be attached to the two separators. Referring to FIG. 2C, a second mounting position 2232 may be rotated after a connecting portion 222 unwound from a connecting portion supplying portion 310 comes into contact with the second mounting position.

FIGS. 3A to 3E illustrate a connecting portion being supplied to a second holding portion according to the present disclosure.

Referring to FIGS. 3A to 3E, the separator supply device according to the present disclosure may further include a connecting portion supplying portion 310, a connecting portion fixing portion 320, and a connecting portion cutting portion 330. A connecting portion 222 may be wound in a roll shape in a connecting portion supplying portion 310. A connecting portion 222 may be unwound and provided from a connecting portion supplying portion 310. The device of the present disclosure may further include a connecting portion detecting portion 360. A connecting portion detecting portion 360 may measure the thickness of a connecting portion 222 wound in a connecting portion supplying portion 310. A control portion may determine whether a connecting portion 222 is exhausted based on the measured thickness.

A connecting portion fixing portion 320 may fix one end of a connecting portion 222. A connecting portion fixing portion 320 may pressurize both surfaces formed at one end of a connecting portion 222. For example, a connecting portion fixing portion 320 may be a gripper that fixes one end of a connecting portion 222.

A connecting portion fixing portion 320 may move in a direction away from a connecting portion supplying portion 310 and unwind a connecting portion 222. For example, a connecting portion fixing portion 320 may move while fixing one end of a connecting portion 222 unwound from a connecting portion supplying portion 310 and unwind the connecting portion 222 to a preset length.

A connecting portion cutting portion 330 may cut a part of a connecting portion 222. A connecting portion cutting portion 330 may be provided between one end of a connecting portion 222 fixed by a connecting portion fixing portion 320 and a connecting portion supplying portion 310 to cut the connecting portion 222. For example, a connecting portion cutting portion 330 may be a knife or a cutter.

Ultimately, after a connecting portion fixing portion 320 unwinds a connecting portion 222 by a preset length, a second holding portion 220 may move and come into contact with the connecting portion 222. When a connecting portion 222 comes into contact with a second mounting position 2232 of a second holding portion 220, a connecting portion cutting portion 330 may cut one area of the connecting portion 222, and the fixation of the connecting portion fixing portion 320 and the connecting portion 222 may be released.

However, the connecting portion 222 may break during unwinding due to the adhesive strength of the connecting portion 222. To prevent breakage, the separator supplying device according to the present disclosure may further include a guide block 350 and an unwinding guide portion 340.

A guide block 530 may be provided between one area of a connecting portion 222 cut by a connecting portion cutting portion 330 and a connecting portion supplying portion 310 to fix the connecting portion 222. A guide block 350 may temporarily fix a connecting portion 222. A guide roller may pressurize and fix both sides of a connecting portion 222.

An unwinding guide portion 340 may unwind a connecting portion 222 to a preset length by moving in a direction opposite to the direction in which a connecting portion fixing portion 320 moves. In order to prevent a connecting portion 222 from being broken by a connecting portion fixing portion 320, an unwinding guide portion 340 may unwind a connecting portion 222 to a preset length.

An unwinding guide portion 340 may be provided in the form of a roller. For example, an unwinding guide portion 340 may be an idle-roller. An adhesive portion may be provided along the outer circumference of an unwinding guide portion 340, and the unwinding guide portion 340 may move so that the adhesive portion may be unwound from a connecting portion supplying portion 310.

An unwinding guide portion 340 pressurizes one end of a connecting portion 222 but does not fix the connecting portion. An unwinding guide portion 340 may be in contact with a connecting portion 222 along the outer circumference so that a wide contact surface may be formed. Through this, the problem that a connecting portion 222 is broken may be prevented.

In order for an unwinding guide portion 340 to guide a connecting portion 222, a guide roller may fix one end of the connecting portion 222. An unwinding guide portion 340 may guide a connecting portion 222 through moving. One area of a connecting portion 222 provided between an end of the connecting portion 222 and a guide roller may come into contact with a connecting portion fixing portion 320.

After an unwinding guide portion 340 unwinds a connecting portion 222 to a preset length, a guide roller may move and be separated from the connecting portion 222. Thereafter, a connecting portion fixing portion 320 may move to easily unwind a connecting portion 222.

FIGS. 4 to 7 illustrate a flowchart of one example of a separator supplying method according to the present disclosure.

Figure 4:
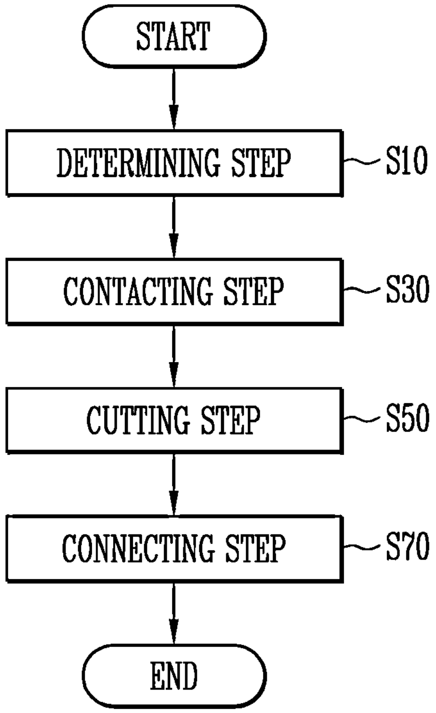
FIGS. 4 to 7 illustrate a flowchart of one example of a separator supplying method according to the present disclosure.

Referring to FIG. 4, the separator supplying method according to the present disclosure includes a contacting step S30 in which a separator unwinding from a first holding portion 210 and a second holding portion 220, in each of which a roll-shaped separator is wound, comes into contact with the first holding portion 210 and the second holding portion 220. This is to ensure that a separator cutting process that is performed thereafter is performed stably.

A first contacting portion 2102 and a first retaining portion 2101 provided in a first holding portion 210 will come into contact with one separator 111, and a second contacting portion 2202 and a second retaining portion 2201 provided in a second holding portion 220 will come into contact with the other separator 121. A first contacting portion 2102 and a second contacting portion 2202 may each be separated from the separator after the separator is cut.

Meanwhile, as described above, the separator supplying device 10 may further include a sensing portion 181 and 182 for sensing the thickness of a separator wound in a supplying portion and a control portion for controlling the sensing portion. Based on this, the supplying method of the present disclosure may further include a determining step S10 for determining the rotation of a supplying portion before a first holding portion 210 and a second holding portion 220 come into contact with a separator.

Referring to FIG. 4, after a contacting step S30, a cutting step S50 in which a cutting portion 221 cuts one separator 111 and the other separator 121 may be included. The reason for cutting the two separators is to connect the separators to each other.

Figure 5:
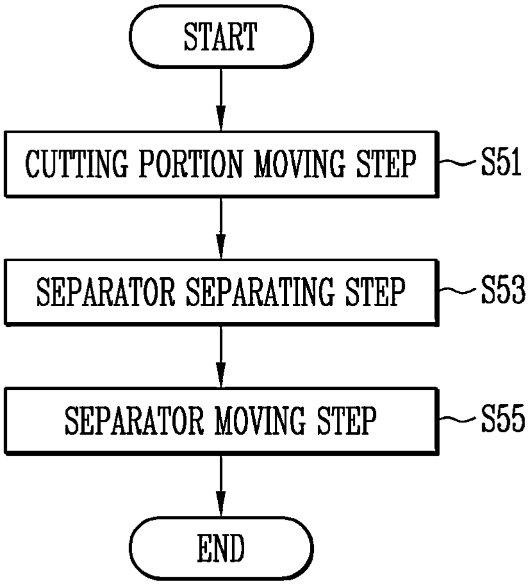

Referring to FIG. 5, a cutting step S50 may include a cutting portion moving step S51 in which a cutting portion 221 moves toward a separator to cut the separator. A cutting portion 221 may be provided between a second contacting portion 2202 and a second retaining portion 2201 to cut two separators. When cutting a separator, a first arrangement in which a cutting portion 221 provided in a second holding portion 220 is positioned toward a first holding portion 210 may be formed.

Thereafter, a cutting step S50 may further include a separator separating step S53 in which a first contacting portion 2102 and one separator 111 are separated, and a second contacting portion 2202 and the other separator 121 are separated. One separator 111 separated from a first contacting portion 2102 may be separated and recovered by a supplying portion. In addition, the other separator 121 separated from a second contacting portion 2202 may be separated and recovered by a recovering portion.

On the other hand, a first retaining portion 2101 and one separator 111 will still maintain contact, and a second retaining portion 2201 and the other separator 121 will maintain contact.

Thereafter, a cutting step S50 may further include a separator moving step S55 in which the other separator 121 in contact with a second retaining portion 2201 is separated from the second retaining portion 2201 and moves toward a first contacting portion 2102 to move with the first contacting portion 2102.

This is to fix the one separator 111 and the other separator 121 to the first holding portion 210. Through this, a second holding portion may move to attach a connecting portion 222 to a second mounting position 2232.

Referring to FIG. 4, the supplying method of the present disclosure may further include a connecting step S70 in which a connecting portion 222 connects the two separators after a cutting portion 221 cuts the two separators.

Figure 6:
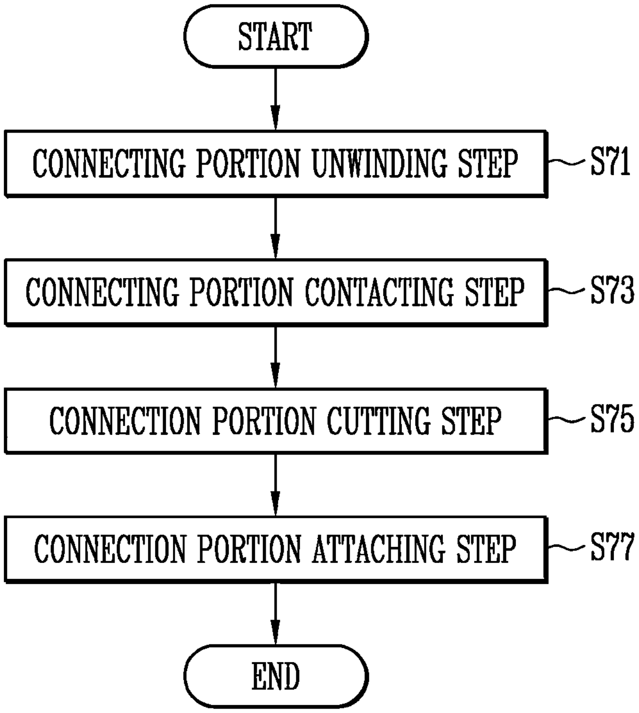

Referring to FIG. 6, a connecting step S70 may include a connecting portion unwinding step S71 in which a connecting portion fixing portion 320 fixing one end of a connecting portion 222 unwound from a connecting portion supplying portion 310 in which the connecting portion 222 is wound moves in a direction away from the connecting portion supplying portion 310 and unwinds the connecting portion 222.

Thereafter, the connecting step S70 may include a connecting portion contacting step S73 in which a second holding portion 220 moves in a direction away from a separator and comes into contact with an unwound connecting portion 222.

After a second holding portion 220 comes into contact with a connecting portion 222, the connecting step may further include a connecting portion cutting step S75 in which a connecting portion cutting portion 330 cutting one area of the connecting portion 222 cuts one area of the connecting portion. In addition, when a second holding portion 220 comes into contact with a connecting portion 222, the fixing of a connecting portion fixing portion 320 will be released. As a result, the connecting portion 222 may be attached to a second mounting position 2232 of the second holding portion 220.

After one area of a connecting portion 222 is cut, the connecting step may further include a connecting portion attaching step S77 in which a second holding portion 220 moves toward a separator and attaches the connecting portion 222 to connect the one separator 111 and the other separator 121.

As described above, the width of a connecting portion 222 and the width of a separator may be different. Generally, the width of a separator will be formed to be longer than the width of a connecting portion 222. In order to make the width of a connecting portion 222 similar to the width of a separator, a connecting portion 222 needs to be manufactured separately. In addition, when a connecting portion 222 with a wide width is unwound, there is a problem that it occupies a large volume.

Therefore, in order to utilize an existing connecting portion 222 to connect the two separators, the connecting portion 222 must be cut along the longitudinal direction of the connecting portion 222. The longitudinal direction of a connecting portion 222 will be formed perpendicular to the width direction of a separator. Therefore, a second mounting position 2232 at which a connecting portion 222 is attached needs to rotate.

Therefore, prior to a connecting portion attaching step S77, a connecting rotation axis rotation step for rotating a second mounting position 2232 may be further included. As described above, since the width of a connecting portion 222 and the width of a separator are different, when a second mounting position 2232 is attached without rotation, a separator may not be stably fixed.

After the step of rotating a second mounting position 2232, a step of rotating a holding body 223 may be further included to form a second arrangement in which a connecting portion 222 is positioned toward a first holding portion 210. Through this, a second holding portion 220 may perform both the functions of cutting and connecting separators. In addition, since a cutting portion 221 and a connecting portion 222 may be provided in a minimized volume, space efficiency may be improved, and manufacturing efficiency may be further improved.

Figure 7:
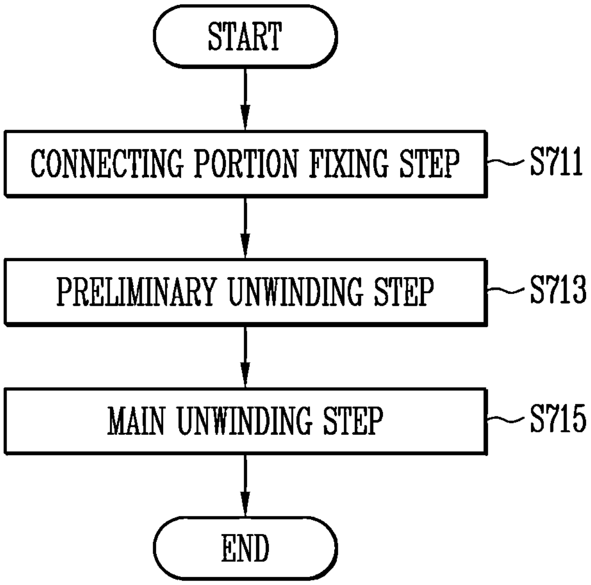

Referring to FIG. 7, a connecting portion unwinding step S71 may include a connecting portion fixing step S711 in which a guide block 350 provided between one area of a connecting portion 222 cut by a connecting portion cutting portion 330 and a connecting portion 222 supplying portion comes into contact with the connecting portion 222. Thereafter, a preliminary unwinding step S713 in which an unwinding guide portion 340 unwinding the connecting portion 222 to a preset length moves in a direction opposite to the direction in which a connecting portion fixing portion 320 moves may be further included. As described above, when the connecting portion fixing portion 320 unwinds a connecting portion 222, the problem that a connecting portion 222 is broken may be prevented.

After a connecting portion 222 is unwound by an unwinding guide portion 340 to a preset length, a main unwinding step S715 in which a guide block 350 and a connecting portion 222 are separated and a connecting portion fixing portion 320 moves may be further included. When a connecting portion 222 is unwound in advance by an unwinding guide portion 340 and a connecting portion fixing portion 320 moves, the possibility of breaking the connecting portion 222 breaking will be lowered.

The present disclosure may be modified and implemented in various forms, and its scope is not limited to the embodiments described above. Therefore, if a modified embodiment includes components of the present disclosure, it should be regarded as falling within the scope of the rights of the present disclosure.

What is claimed is:

1. A separator supplying device comprising:

a first supplying portion and a second supplying portion in which roll-shaped separators are each wound;

a guide portion guiding one separator of the separator wound in the first supplying portion and the separator wound in the second supplying portion to be unwound and move toward a stacking area in which the one separator is stacked;

a fixing portion in which another separator connectable to the one separator is unwound and fixed; and a first holding portion and a second holding portion, which are disposed with the one separator and the other separator interposed therebetween and are capable of moving toward each other so as to be connectable and separable from the one separator and the other separator, in order to cut and connect the one separator and the other separator;

wherein a preset first cutting area is positioned on a separator of the first supplying portion, a preset second cutting area is positioned on a separator of the second supplying portion, and the preset second cutting area is positioned farther from the stacking area than the preset first cutting area, and the second holding portion includes:

a holding body forming an outer shape of the second holding portion;

a cutting portion provided at a first mounting position preset in the holding body and configured to cut each of the preset first cutting area and the preset second cutting area; and a connecting portion provided at a second mounting position preset in the holding body and configured to connect the preset first cutting area and the preset second cutting area to each other after the cutting portion cuts the preset first cutting area and the preset second cutting area.

2. The separator supplying device according to claim 1, wherein the second holding portion is deformable into a first arrangement in which the cutting portion is positioned toward the first holding portion and a second arrangement in which the connecting portion is positioned toward the first holding portion.

3. The separator supplying device according to claim 2, wherein the second holding portion further includes a body rotation axis provided in parallel with the width direction of the separator through the holding body and rotatably supporting the holding body, and is deformable into any one arrangement of the first arrangement and the second arrangement through the rotation of the holding body based on the body rotation axis.

4. The separator supplying device according to claim 3, wherein the second holding portion further includes a connecting rotation axis provided perpendicular to the width direction of the separator and the length direction of the separator, and the connecting portion is rotatable through the rotation of the second mounting position based on the connecting rotation axis.

5. The separator supplying device according to claim 1, wherein, when the length from the preset second cutting area of the one separator to one end wound in the supplying portion becomes less than or equal to a preset residual length, the cutting portion cuts the preset second cutting area of the one separator and the preset first cutting area of the other separator.

6. The separator supplying device according to claim 1, wherein the first supplying portion and the second supplying portion each include a roller on which the two separators are wound, and when the length of the one separator becomes less than or equal to a preset residual length, the rotation of the roller on which the one separator is wound is stopped, and when the one separator and the other separator are connected by the connecting portion, the rotation of the roller on which the other separator is wound is initiated.

7. The separator supplying device according to claim 6, further comprising a sensing portion for sensing the thickness of the separator wound on the roller.

8. The separator supplying device according to claim 7, further comprising a control portion controlling the sensing portion, the roller, the first holding portion, and the second holding portion.

9. The separator supplying device according to claim 1, wherein the stacking area is provided at a position opposite to the second holding portion based on the path along which the two separators are unwound.

10. The separator supplying device according to claim 1, wherein the first holding portion includes a first contacting portion and a first retaining portion contactable with and separable from the one separator or the other separator, the second holding portion includes a second contacting portion and a second retaining portion contactable with and separable from a separator with which the first holding portion is uncontacted, and the two separators are each fixable by the first contacting portion, the first retaining portion, the second contacting portion, and the second retaining portion.

11. The separator supplying device according to claim 1, comprising:

a connecting portion supplying portion on which the connecting portion is wound;

a connecting portion fixing portion fixing one end of the connecting portion and moving in a direction away from the connecting portion supplying portion to unwind the connecting portion; and a connecting portion cutting portion capable of cutting an area of the connecting portion.

12. The separator supplying device according to claim 11, wherein, when the connecting portion comes into contact with the second mounting position of the second holding portion, the connecting portion cutting portion cuts an area of the connecting portion, and the fixing of the connecting portion fixing portion and the connecting portion is released.

13. The separator supplying device according to claim 11, further comprising:

a guide block provided between the area of the connecting portion cut by the connecting portion cutting portion and the connecting portion supplying portion to fix the connecting portion; and an unwinding guide portion capable of unwinding the connecting portion by a preset length by moving in a direction opposite to the direction in which the connecting portion fixing portion moves.

14. A separator supplying method, which is a method of supplying a separator including: a first supplying portion and a second supplying portion in which roll-shaped separators are each wound; a guide portion guiding one separator of the separator wound in the first supplying portion and the separator wound in the second supplying portion to be unwound and move toward a stacking area in which the one separator is stacked; and a fixing portion in which another separator connectable to the one separator is unwound and fixed, wherein a separator wound in the first supplying portion and a separator wound in the second portion include a preset first cutting area positioned on each of the separators and a preset second cutting area positioned farther from the stacking area than the preset first cutting area, the method comprising:

a contacting step in which a first holding portion and a second holding portion come into contact with the two separators;

a cutting step in which a cutting portion provided at a first mounting position of the second holding portion cuts each of the one separator and the other separator; and a connecting step in which a connecting portion provided at a second mounting position of the second holding portion connects one of the one separator and the other separator.

15. The separator supplying method according to claim 14, wherein in the cutting step, the cutting portion provided at the second holding portion forms a first arrangement positioned toward the first holding portion, and in the connecting step, the connecting portion forms a second arrangement positioned toward the first holding portion.

16. The separator supplying method according to claim 14, further comprising: a determining step in which a control portion controlling the first supplying portion, the second supplying portion, the first holding portion, and the second holding portion compares the length from the preset second cutting area of the one separator to one end wound in the supplying portion with the preset residual length to determine rotation of the supplying portion.

17. The separator supplying method according to claim 14, wherein in the contacting step, a first contacting portion of the first holding portion and a first retaining portion are in contact with the one separator, and a second contacting portion of the second holding portion and a second retaining portion are in contact with the other separator.

18. The separator supplying method according to claim 17, wherein the cutting step includes:

a cutting portion moving step in which the cutting portion moves toward the separators to cut the separators;

a separator separating step in which, after the separator is cut, the first contacting portion and the one separator are separated, and the second contacting portion and the other separator are separated; and a separator moving step in which the other separator in contact with the second retaining portion is separated from the second retaining portion and moves toward the first contacting portion to contact with the first contacting portion.

19. The separator supplying method according to claim 18, wherein the connecting step includes:

a connecting portion unwinding step in which a connecting portion fixing portion fixing one end of a connecting portion unwound from a connecting portion supplying portion in which the connecting portion is wound moves in a direction away from the connecting portion supplying portion and unwinds the connecting portion;

a connecting portion contacting step in which the second holding portion moves in a direction away from the two separators and come into contact with the unwound connecting portion;

a connecting portion cutting step in which a connecting portion cutting portion cutting an area of the connecting portion cuts an area of the unwound connecting portion; and a connecting portion attaching step in which the second holding portion moves toward the separators and attaches the connecting portion to connect the one separator and the other separator.

20. The separator supplying method according to claim 19, wherein the connecting portion unwinding step includes:

a connecting portion fixing step in which a guide block provided between one area of the connecting portion cut by the connecting portion cutting portion and the connecting portion supplying portion comes into contact with the connecting portion;

a preliminary unwinding step in which an unwinding guide portion unwinding the connecting portion by a preset length moves in a direction opposite to the direction in which the connecting portion fixing portion moves; and a main unwinding step in which, when the connecting portion is unwound by a preset length, the guide block and the connecting portion are separated, and the connecting portion fixing portion moves.

* * * * *